Patented Feb. 21, 1933

1,898,199

UNITED STATES PATENT OFFICE

CARL ULRICH FRANZ MANNICH, OF BERLIN-STEGLITZ, GERMANY

CRYSTALLIZED DIGITALIS GLUCOSIDE AND METHOD OF PRODUCING THE SAME

No Drawing. Application filed September 23, 1929, Serial No. 394,741, and in Germany October 4, 1928.

Three crystallized homogeneous glucosides from the leaves of digitalis are known up to date, namely:

(1) The digitoxin (easily soluble in chloroform), (2) The gitoxin or Digitaline insoluble in alcohol and chloroform (Berichte der Deutsch-Chemischen Gesellschaft of the year 1925, page 1515; Archiv for exp. Pathologie and Pharmakologie, year 1926, pages 264 and 327).

(3) The gitalinum crystallisatum (Archiv f. exp. Pathologie and Pharmakologie, year 1926, pages 289 and 327).

Of these compounds only digitoxin is manufactured in industry in comparatively pure state and used for therapeutic purposes.

Now I have found a possibility of producing from the leaves of digitalis a further heretofore unknown homogeneous and crystalline glucoside, which is clearly not identical with digitoxin nor with gitoxin, and also differs from the gitalinum crystallisatum Cloetta in spite of a certain similarity in essential points.

In producing this new glucoside a concentrated digitalis-extract, such as for instance is described in the German Patent No. 383,480, or a mixture of the natural digitalis glucosides which as much as possible is freed from foreign matter, such as for instance is described in the German Patent 427,274, may be used as starting substance. In the mixture of the natural digitalis glucosides ingredients are present which are soluble in chloroform, moreover ingredients which are soluble in diluted alcohol or methyl alcohol and finally ingredients, which are insoluble or difficultly soluble in the solvents mentioned.

The new substance, which I have found and claim as my invention and which hereinafter I term the new glucoside, is contained in that portion which is only difficultly soluble in chloroform as well as in diluted alcohol or methyl alcohol. From this portion the new glucoside can be obtained in pure state by crystallization from acetone or 70% of alcohol.

This glucoside forms small white crystal needles. When dried in vacuum at 70° up to constant weight the substance melts at 225° C., whereas it decomposes if heat is applied quickly up to 210° C. and then slowly increasing the temperature at the rate of 2° per minute. If the heating is carried out quickly the melting point will be considerably higher, say about 245° C. similar conditions are met with when determining the melting point of digitalis glucoside gitoxin (compare Berichte der Deutschen Chemischen Gesellschaft of the year 1928, page 1847 and of the year 1925, page 1516 foot-note).

The air-dried new glucoside dissolves at ordinary temperature in water at a rate of 1:6000, in chloroform 1:300, in acetone 1:200 and moreover in less than 50 parts of alcohol.

With concentrated sulphuric acid the new glucoside colors brown. When mixed with concentrated sulphuric acid containing a trace of a ferric salt a red, somewhat violet color arises. With the Keller-Kilian-test the blue digitoxo-reaction will be obtained.

The new glucoside is optically active. The rotation of the substance freed from water of crystallization in alcoholic solution amounts to $$[\alpha]D^{20°} = +33.3°$$

In the elementary analysis of the new glucoside dried in vacuum at 70° over phosphorus pentoxide I find values which correspond with the formula

$C_{41}H_{64}O_{17}$ (calculated C59.24%, H8.01%)

When the new glucoside is dried it loses 8.15% in weight, corresponding to 4 molecules of water of crystallization; and the dried substance absorbs again 8.15% water when allowed to stand in moist air.

When split in 0.5% alcoholic hydrochloric acid a very fine crystalline genin of the formula $C_{23}H_{34}O_5$, which melts at 205–207° C. is produced.

The new glucoside proves to be highly physiologically active. When working out test results with frogs after the system of Houghton (a test carried out without taking note of the time) the new glucoside has proved to be as efficient as digitoxin.

For producing the new glucoside I give the following example:

A solution of 50 g. of a mixture of the natural digitalis glucoside in 200 ccm. of alcohol or methyl alcohol is mixed with 400 ccm. of water and shaken three times each with 150 ccm. of chloroform. When thus treated the mixture will be settled in three different layers. The lowest layer in that ingredient, which is easily soluble in chloroform, and the highest layer is that ingredient, which is easily soluble in diluted alcohol or methyl alcohol. The viscid sticky central layer, the amount of which as a rule is 20–30 g., contains the new glucoside. The central layer is carefully separated and then dissolved in 70% alcohol. When allowed to slowly evaporate gradually a glucoside segregates in the shape of crystalline needles, which can be purified by re-crystallization from acetone or 70% of alcohol. The tendency to crystallize, which is very quick with the impure material, meets with no difficulty later on.

For gaining the new glucoside particularly the leaves of digitalis lanata are well adapted.

When in my claims I speak of acetone I desire to be understood as including a strong solution of alcohol, for instance, 70% concentration, as an equivalent thereof.

I claim:

1. That step in the method of producing a new isolated crystalline digitalis glucoside which consists in adding chloroform and dilute alcohol to purified raw glucoside and separating the precipitate by filtration.

2. As a new article of manufacture, the isolated crystalline digitalis glucoside whose probable formula is $C_{41}H_{64}O_{17}$ which has an optic rotation in alcohol solution of about $(\alpha)D^{20} = 33.3°$, is readily soluble in acetone, difficultly soluble in chloroform, and is colored brown by concentrated sulphuric acid.

3. The method of producing a new isolated crystalline digitalis glucoside which consists in separating from natural digitalis glucosides by means of chloroform, the constituents which are readily soluble therein, and by means of dilute alcohol, the constituents which are readily soluble therein, dissolving the remainder in acetone and crystallizing the digitalis glucoside from the resulting solution.

In testimony whereof I have signed my name to this specification.

CARL ULRICH FRANZ MANNICH.